(12) United States Patent
Shveidel et al.

(10) Patent No.: US 12,174,752 B2
(45) Date of Patent: Dec. 24, 2024

(54) BIN-LESS METADATA PAGES ALLOCATOR FOR STORAGE CLUSTER WITH LOG-STRUCTURED METADATA

(71) Applicant: Dell Products L.P., Round Rock, TX (US)

(72) Inventors: Vladimir Shveidel, Pardes-Hana (IL); Uri Shabi, Tel Mond (IL); Vamsi K. Vankamamidi, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/132,564

(22) Filed: Apr. 10, 2023

(65) Prior Publication Data

US 2024/0338322 A1    Oct. 10, 2024

(51) Int. Cl.
*G06F 12/109* (2016.01)
*G06F 12/02* (2006.01)

(52) U.S. Cl.
CPC ........ *G06F 12/109* (2013.01); *G06F 12/0238* (2013.01); *G06F 12/0292* (2013.01)

(58) Field of Classification Search
CPC .............. G06F 12/109; G06F 12/0238; G06F 12/0292; G06F 2212/7201; G06F 12/10
See application file for complete search history.

(56) References Cited

U.S. PATENT DOCUMENTS

| | | | |
|---|---|---|---|
| 10,101,934 B1 | 10/2018 | Ben-Moshe et al. | |
| 10,402,091 B1 | 9/2019 | Vankamamidi et al. | |
| 11,042,296 B1 | 6/2021 | Shveidel et al. | |
| 11,347,725 B2 | 5/2022 | Shveidel et al. | |
| 11,436,142 B1 | 9/2022 | Vankamamidi et al. | |
| 11,520,527 B1 | 12/2022 | Alkalay et al. | |
| 11,599,460 B2 | 3/2023 | Derzhavetz et al. | |
| 2015/0193339 A1* | 7/2015 | Kim | G06F 12/10 711/103 |
| 2016/0092113 A1* | 3/2016 | Veal | G06F 3/064 711/103 |
| 2017/0024295 A1* | 1/2017 | Klughart | G06F 13/4247 |
| 2020/0264973 A1* | 8/2020 | Lee | G06F 13/1668 |
| 2021/0318832 A1* | 10/2021 | Vankamamidi | G06F 3/0631 |
| 2022/0107887 A1* | 4/2022 | Kim | G06F 12/0253 |

(Continued)

*Primary Examiner* — Khoa D Doan
*Assistant Examiner* — Tong B. Vo
(74) *Attorney, Agent, or Firm* — BainwoodHuang

(57) ABSTRACT

Techniques for providing a "bin-less" metadata page allocator for clustered systems with log-structured metadata storage. The techniques include providing a mapping structure in memory of a storage node of a clustered system. The mapping structure can have multiple layers configured to map logical addresses of metadata pages to physical addresses of storage drives within a storage array. The techniques include providing a translation table configured to translate logical addresses of metadata pages to corresponding current physical addresses of storage drives within the storage array. The techniques include, in response to an allocated logical address of a metadata page no longer being in-use, replacing its corresponding current physical address with a predefined value in the translation table, freeing the logical address, and inserting the freed logical address into a free logical address array. The techniques include allocating the freed logical address from the free logical address array.

20 Claims, 4 Drawing Sheets

(56) References Cited

U.S. PATENT DOCUMENTS

2022/0129158 A1* 4/2022 Kim .................... G06F 12/0882
2022/0414086 A1   12/2022 Shveidel et al.
2024/0126461 A1*  4/2024 Noronha ................. G06F 16/10

* cited by examiner

BIN-LESS METADATA PAGES ALLOCATOR FOR STORAGE CLUSTER WITH LOG-STRUCTURED METADATA

BACKGROUND

Clustered storage systems (or "clustered systems") employ various techniques to protect and/or distribute electronic data such as metadata and user data. In response to receipt from a client (or "host") computer of a write input/output (IO) request to a storage object (e.g., a volume (VOL), logical unit (LU), filesystem), a storage processor (or "storage node") of a clustered system writes pending changes (or "delta updates," "deltas") to metadata or user data of the storage object to a delta log in memory. Once the deltas for the storage object have been written to the delta log, the storage node sends an acknowledgement to the host computer that issued the write IO request. At a suitable time, the storage node de-stages or flushes the deltas from the delta log to a metadata (MD) page store on an MD tier of a storage array, which includes one or more storage drives such as solid-state drives (SSDs), flash drives, or hard disk drives (HDDs).

SUMMARY

In a clustered system, each MD page can correspond to a logical address within a logical address space of a storage node. The logical address can function as a unique page reference or identifier of the MD page. The storage node can maintain a bin structure in its memory that includes at least two hierarchical levels, in which each level includes multiple bins of free or un-allocated logical addresses for MD pages. The storage node can allocate one or more logical addresses for MD pages, as desired and/or required, from the bins of the hierarchical bin structure. Such an approach to allocating logical addresses for MD pages in a clustered system can have drawbacks, however, because for each allocation (or reclamation) of a logical address, a storage node typically performs several persistent operations including reading and updating at least one bin of a hierarchical bin structure, which can increase storage capacity and/or performance overhead and ultimately degrade overall performance of the clustered system.

Techniques are disclosed herein for providing a "bin-less" MD page allocator for clustered systems with log-structured MD storage. The disclosed techniques can be performed in association with storage nodes that have delta log-based architectures. The disclosed techniques can include providing or implementing a mapping structure in memory of a storage node of a clustered system. The mapping structure can have multiple layers configured to map logical addresses of MD pages to physical addresses of storage drives within a storage array. The disclosed techniques can include providing or implementing a translation table in the memory of the storage node. The translation table can be configured to translate or map a logical address from among the logical addresses of MD pages to a corresponding current physical address from among the physical addresses of storage drives within the storage array. The logical address can be an allocated logical address within a logical address space of the storage node. The disclosed techniques can include, in response to a previously allocated logical address of an MD page no longer being in-use, replacing the corresponding current physical address of the logical address with a predefined value in the translation table. The disclosed techniques can include freeing or reclaiming the logical address, and inserting or adding the freed or reclaimed logical address into an array for free logical addresses. The disclosed techniques can include allocating the freed or reclaimed logical address from the free logical address array. In this way, the disclosed techniques can avoid having to perform persistent operations such as reading and updating bins of hierarchical bin structures that contain free or un-allocated logical addresses of MD pages, thereby improving overall performance of the clustered systems.

In certain embodiments, a method of allocating logical addresses of metadata pages in a clustered system with log-structured metadata storage includes mapping, by a translation table, a plurality of logical addresses of metadata pages to a plurality of corresponding current physical addresses of storage drives, respectively. The method includes, in response to a logical address from among the plurality of logical addresses of metadata pages being no longer in-use, replacing, in the translation table, a corresponding current physical address from among the plurality of corresponding current physical addresses of storage drives with a predefined value, freeing the logical address, and inserting the logical address into a free logical address array. The method includes allocating the logical address for a metadata page from the free logical address array.

In certain arrangements, the method includes scanning the translation table (TT) for TT entries that contain the predefined value.

In certain arrangements, the method includes writing copies of contents of the TT entries to a persistent journal.

In certain arrangements, the method includes, in response to scanning the translation table (TT), identifying a TT entry that contains the logical address mapped to the predefined value.

In certain arrangements, the method includes maintaining a dedicated table that includes all reclaimed logical addresses in the clustered system.

In certain arrangements, the method includes determining that the logical address contained in the identified TT entry is not included in the dedicated table of reclaimed logical addresses.

In certain arrangements, the method includes performing inserting the logical address into the free logical address array in response to determining that the logical address is not included in the dedicated table of reclaimed logical addresses.

In certain arrangements, the method includes initiating scanning the translation table in response to a specified fill level of the free logical address array falling below a predefined threshold.

In certain arrangements, the method includes, in response to the specified fill level of the free logical address array reaching or exceeding the predefined threshold, terminating scanning the translation table.

In certain arrangements, the method includes, in response to completing scanning the translation table and the specified fill level of the free logical address array not reaching or exceeding the predefined threshold, increasing a maximum allowable logical address of the metadata pages, increasing a number of TT entries in the translation table, and mapping one or more free logical addresses contained in the TT entries to the predefined value.

In certain arrangements, the method includes inserting the one or more free logical addresses into the free logical address array.

In certain arrangements, the method includes, in response to the free logical address array containing an insufficient number of free logical addresses, allocating one or more logical addresses from a memory structure containing a specified number of spare logical addresses.

In certain arrangements, the method includes comparing the logical address for the metadata page with a maximum allowable logical address, and allocating the logical address in response to determining that the logical address does not exceed the maximum allowable logical address.

In certain embodiments, a system for allocating logical addresses of metadata pages in a clustered system with log-structured metadata storage includes a memory and processing circuitry configured to execute program instructions out of the memory to map, by a translation table, a plurality of logical addresses of metadata pages to a plurality of corresponding current physical addresses of storage drives, respectively. The processing circuitry is configured to execute the program instructions out of the memory, in response to a logical address from among the plurality of logical addresses of metadata pages being no longer in-use, to replace, in the translation table, a corresponding current physical address from among the plurality of corresponding current physical addresses of storage drives with a predefined value, to free the logical address, and to insert the logical address into a free logical address array. The processing circuitry is configured to execute the program instructions out of the memory to allocate the logical address for a metadata page from the free logical address array.

In certain arrangements, the processing circuitry is configured to execute the program instructions out of the memory to scan the translation table (TT) for TT entries that contain the predefined value.

In certain arrangements, the processing circuitry is configured to execute the program instructions out of the memory to initiate scanning the translation table in response to a specified fill level of the free logical address array falling below a predefined threshold.

In certain arrangements, the processing circuitry is configured to execute the program instructions out of the memory, in response to the specified fill level of the free logical address array reaching or exceeding the predefined threshold, to terminate scanning the translation table.

In certain arrangements, the processing circuitry is configured to execute the program instructions out of the memory, in response to completing scanning the translation table and the specified fill level of the free logical address array not reaching or exceeding the predefined threshold, to increase a maximum allowable logical address of the metadata pages, to increase a number of TT entries in the translation table, and to map one or more free logical addresses contained in the TT entries to the predefined value.

In certain arrangements, the processing circuitry is configured to execute the program instructions out of the memory to insert the one or more free logical addresses into the free logical address array.

In certain embodiments, a computer program product includes a set of non-transitory, computer-readable media having instructions that, when executed by processing circuitry, cause the processing circuitry to perform a method including mapping, by a translation table, a plurality of logical addresses of metadata pages to a plurality of corresponding current physical addresses of storage drives, respectively. The method includes, in response to a logical address from among the plurality of logical addresses of metadata pages being no longer in-use, replacing, in the translation table, a corresponding current physical address from among the plurality of corresponding current physical addresses of storage drives with a predefined value, freeing the logical address, and inserting the logical address into a free logical address array. The method includes allocating the logical address for a metadata page from the free logical address array.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for providing a "bin-less" metadata (MD) page allocator for clustered systems with log-structured MD storage. The disclosed techniques can include providing or implementing a mapping structure in memory of a storage node of a clustered system. The mapping structure can have multiple layers configured to map logical addresses of MD pages to physical addresses of storage drives within a storage array. The disclosed techniques can include providing or implementing a translation table in the memory of the storage node. The translation table can be configured to translate or map a logical address from among the logical addresses of MD pages to a corresponding current physical address from among the physical addresses of storage drives within the storage array. The disclosed techniques can include, in response to an allocated logical address of an MD page no longer being in-use, replacing the corresponding current physical address of the logical address with a predefined value in the translation table, freeing or reclaiming the logical address, and inserting or adding the freed or reclaimed logical address into an array for free logical addresses. The disclosed techniques can include allocating the freed or reclaimed logical address from the free logical address array. In this way, the disclosed techniques can avoid having to perform persistent operations such as reading and updating bins of hierarchical bin structures that contain free or un-allocated logical addresses of MD pages, thereby improving overall performance of the clustered systems.

Figure 1:
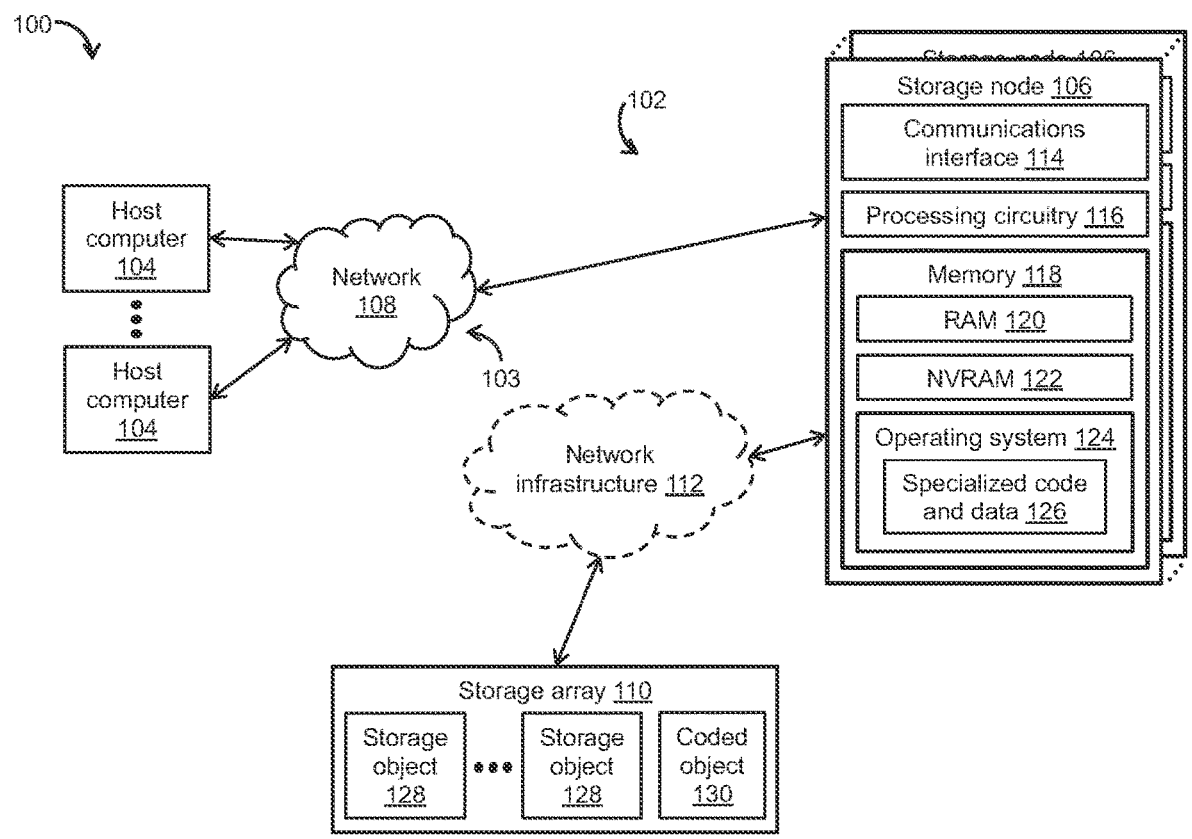
FIG. 1 is a block diagram of an exemplary storage environment, in which techniques can be practiced for providing a "bin-less" metadata page allocator for clustered systems with log-structured metadata storage.

FIG. 1 depicts an illustrative embodiment of an exemplary storage environment 100, in which techniques can be practiced for providing a "bin-less" MD page allocator for clustered systems with log-structured MD storage. As shown in FIG. 1, the storage environment 100 can include a clustered system 102, a plurality of host computers 104, and a communications medium 103 that includes at least one network 108. The clustered system 102 can include one or more storage processors 106 (or "storage node(s)") and a storage array 110. For example, each of the plurality of host computers 104 may be configured as a web server computer, a file server computer, an email server computer, an enterprise server computer, and/or any other suitable client/server computer or computerized device. The plurality of host computers 104 can be configured to provide, over the network 108, storage input/output (IO) requests (e.g., small computer system interface (SCSI) commands, network file system (NFS) commands) to the storage nodes 106. Such storage IO requests (e.g., write IO requests, read IO requests) can direct each storage node 106 to write or read data blocks, data pages, data files, or any other suitable data elements to/from volumes (VOLs), logical units (LUs), file systems, and/or any other suitable storage objects, such as a plurality of storage objects 128 maintained in the storage array 110.

The communications medium 103 can be configured to interconnect the plurality of host computers 104 with the storage nodes 106 of the clustered system 102 to enable them to communicate and exchange data and/or control signaling. As shown in FIG. 1, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, and so on, or any suitable combination thereof.

Each storage node 106 can be connected directly to the storage array 110 or via an optional network infrastructure 112, which can include an Ethernet network, a Fiber Channel network, an InfiniBand network, and/or any other suitable network(s). As shown in FIG. 1, the storage node 106 can include a communications interface 114, processing circuitry 116, and memory 118. The communications interface 114 can include one or more of an InfiniBand interface, an Ethernet interface, an IEEE 802.11x (WiFi) interface, a Bluetooth interface, and/or any other suitable communications interface. The communications interface 114 can further include SCSI target adapters, network interface adapters, and/or any other suitable adapters for converting electronic, optical, and/or wireless signals received over the network 108 to a form suitable for use by the processing circuitry 116.

The memory 118 can include volatile memory such as random-access memory (RAM) 120 or any other suitable volatile memory, as well as persistent memory such as nonvolatile random-access memory (NVRAM) 122 or any other suitable persistent memory. The memory 118 can store a variety of software constructs realized in the form of specialized code and data 126 (e.g., program instructions) that can be executed by the processing circuitry 116 to carry out the techniques and/or methods disclosed herein. The memory 118 can further include an operating system 124 such as a Linux operating system (OS), Unix OS, Windows OS, or any other suitable operating system.

The processing circuitry 116 can include one or more physical storage processors and/or engines configured to execute the specialized code and data 126, as well as data movers, director boards, blades, IO modules, storage drive controllers, switches, and/or any other suitable computer hardware or combination thereof. For example, the processing circuitry 116 may execute the specialized code and data 126 as program instructions out of the memory 118, process storage IO requests (e.g., write IO requests, read IO requests) issued by the respective host computers 104, and/or store metadata and/or user data on the storage array 110 in the storage environment 100, which can be a clustered RAID environment.

As shown in FIG. 1, the storage array 110 can include a coded object 130, which can be configured to store coded data for use in regenerating lost or corrupted data on one or more of the plurality of storage objects 128. In some embodiments, the coded object 130 can be stored on a hard disk drive (HDD) configured to store parity data in a RAID array. Alternatively, or in addition, the storage objects 128 and the coded object 130 can be stored on one or more HDDs, solid state drives (SSDs), flash drives, and/or any other suitable storage drive(s) or device(s). It is noted that each storage node 106 can include a keyboard, a mouse, and/or any other suitable IO device(s), an uninterruptable power supply (UPS), and/or any other suitable storage node component(s).

In the context of the processing circuitry 116 being implemented using one or more storage processors executing the specialized code and data 126, a computer program product can be configured to deliver all or a portion of the specialized code and data 128 to the respective storage processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective storage processor(s), the various techniques and/or methods disclosed herein.

Figure 2:
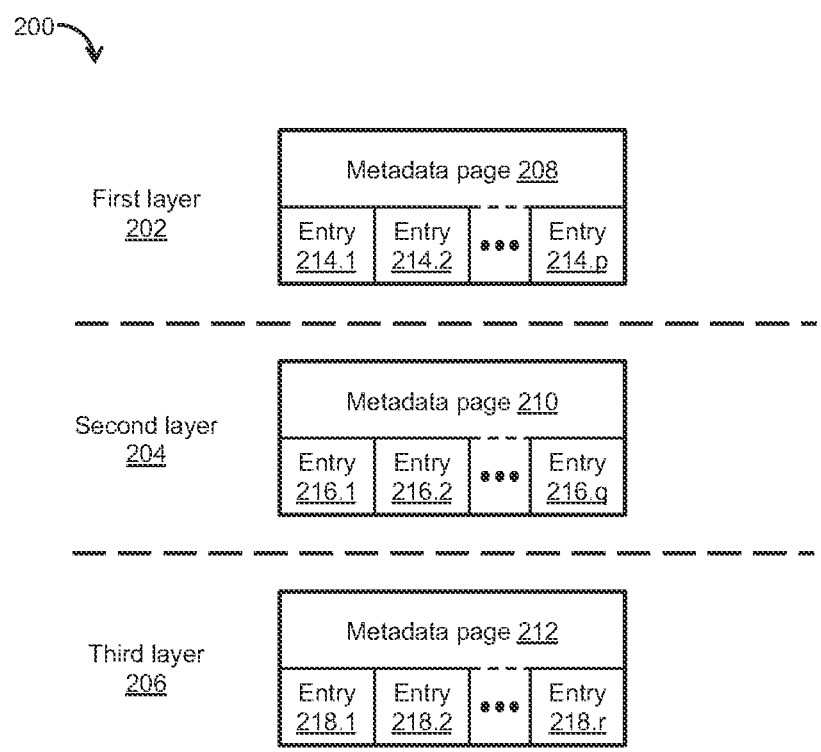
FIG. 2 is a block diagram of an exemplary mapping structure, which can be maintained in memory of a storage node in the storage environment of FIG. 1.

FIG. 2 depicts an exemplary mapping structure 200 that can be maintained by each storage node 106 of the clustered system 102 (see FIG. 1). It is noted that any other suitable mapping structure can be maintained by the storage nodes 106 in accordance with the techniques and/or methods disclosed herein. As shown in FIG. 2, the mapping structure 200 can include multiple layers of metadata, namely, a first layer 202, a second layer 204, and a third layer 206. The first layer 202 can include at least one metadata page 208. Likewise, the second metadata layer 204 can include at least one metadata page 210, and the third metadata layer 206 can include at least one metadata page 212. It is noted that the first layer 202, the second layer 204, and the third layer 206 are illustrated in FIG. 2 as containing metadata pages for purposes of illustration only, and that any other suitable storage elements may be employed.

As further shown in FIG. 2, the metadata page 208 in the first layer 202 can include a plurality of MD page entries 214.1, 214.2, . . . , 214.$p$. Likewise, the metadata page 210 in the second layer 204 can include a plurality of MD page entries 216.1, 216.2, . . . , 216.$q$, and the metadata page 212 in the third layer 206 can include a plurality of MD page entries 218.1, 218.2, . . . , 218.$r$. The plurality of MD page entries 214.1, 214.2, . . . , 214.$p$ of the metadata page 208 can be configured to map, point, or otherwise make reference to at least some of the plurality of MD page entries 216.1, 216.2, . . . , 216.$q$ of the metadata page 210. For example, the first layer 202 may represent various ranges of logical block addresses (LBAs), and each of the plurality of MD page entries 214.1, 214.2, . . . , 214.$p$ of the metadata page 208 may be associated with a particular LBA range. In some embodiments, the first layer 202 can be organized as a tree data structure (or any other suitable data structure), in which each leaf of the tree data structure corresponds to a particular LBA range. Accordingly, the metadata page 208 in the first layer 202 can maintain a particular LBA mapping to the metadata page 210 in the second layer 204.

The plurality of MD page entries 216.1, 216.2, ..., 216.q of the metadata page 210 in the second layer 204 can be configured to map, point, or otherwise make reference to at least some of the plurality of MD page entries 218.1, 218.2, ..., 218.r of the metadata page 212 in the third layer 206. In some embodiments, the second layer 204 can be configured to isolate logical addresses of metadata pages in the first layer 202 from actual physical storage locations of the metadata page. The metadata page 210 can be further configured to encapsulate a physical storage location of a metadata page to allow for its relocation without having to update the metadata page 208 in the first layer 202. In this way, the second layer 204 of the mapping structure 200 can decouple a logical address space from a physical address space.

The plurality of MD page entries 218.1, 218.2, ... 218.q of the metadata page 212 in the third layer 206 can be configured to store metadata (MD) pages. As such, the third layer 206 can be configured to describe actual physical storage locations of MD pages within the storage array 110. In some embodiments, each metadata page in the third layer 206, such as the metadata page 212 (see FIG. 2), can correspond to an MD page having a specified amount of storage capacity (e.g., 4 kilobytes (Kb)). Such an MD page can be highly or completely amortized and stored in the storage array 110 in accordance with the techniques and/or methods described herein.

During operation, the mapping structure 200 of FIG. 2 can be provided or implemented in the memory 118 of each storage node 106 of the clustered system 102 (see FIG. 1). A translation table, such as a translation table 304 (see FIG. 3), can also be provided or implemented in the memory 118 of each storage node 106. Such a translation table can be configured to translate or map logical addresses (e.g., LBAs) of MD pages to corresponding current physical addresses (e.g., PBAs) of storage drives or devices within the storage array 110. One or more of the logical addresses of MD pages can be allocated logical addresses within a logical address space of the storage node 106. In response to an allocated logical address of an MD page no longer being in-use, its corresponding current physical address can become obsolete and be replaced with a predefined value in the translation table. The logical address of the MD page can be freed (or reclaimed) and inserted (or added) into an array for free logical addresses, such as a free LBA array 308 (see FIG. 3). The freed or reclaimed logical address can be allocated from the free logical address array to serve as a unique page reference or identifier of another MD page. In this way, the need for the storage node 106 to perform persistent operations including reading and updating bins of a hierarchical bin structure containing free or un-allocated logical addresses can be avoided.

Figure 3:
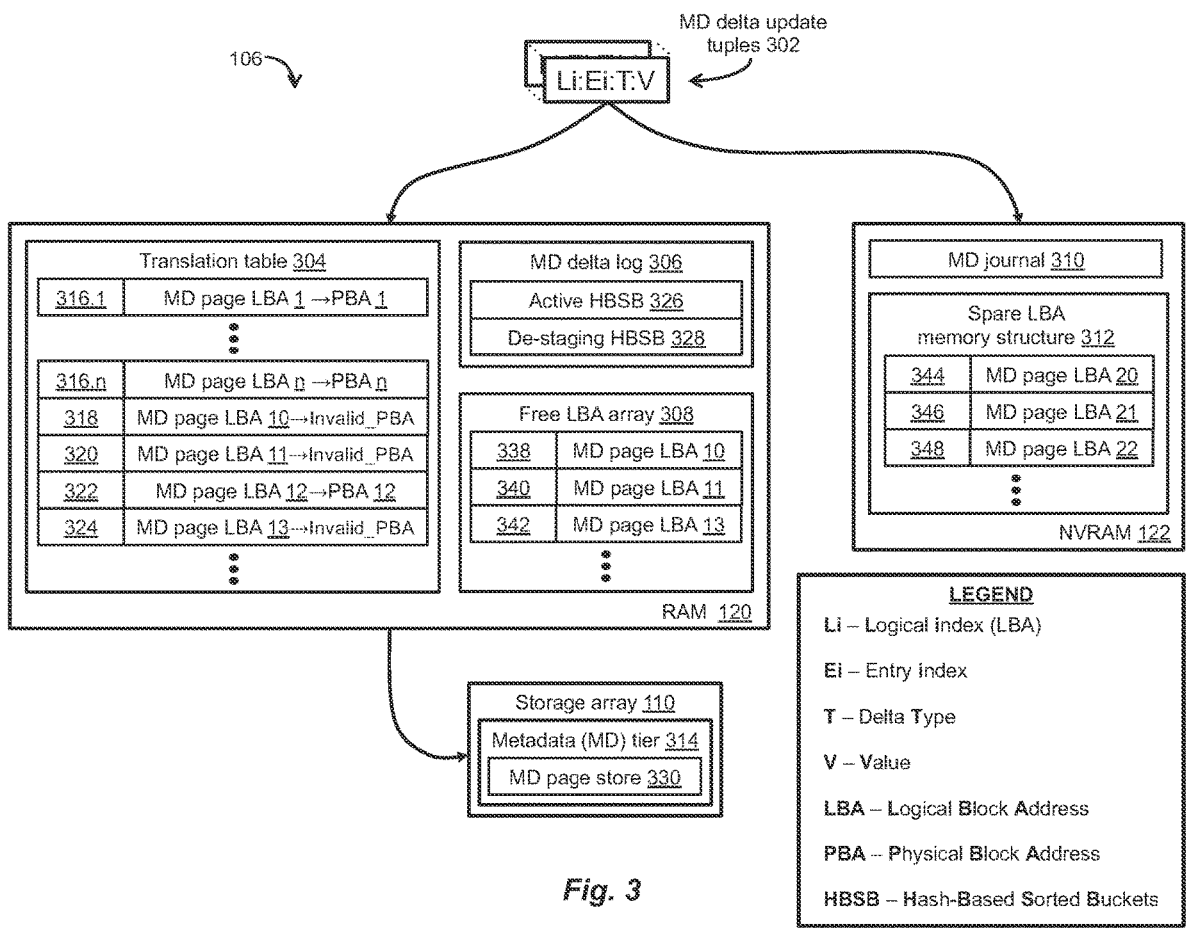
FIG. 3 is a block diagram of volatile memory components, persistent memory components, and storage array components of a storage node in the storage environment of FIG. 1.

The disclosed techniques for providing a "bin-less" MD page allocator for clustered systems with log-structured MD storage will be further understood with reference to the following illustrative example and FIGS. 2 and 3. FIG. 3 depicts several exemplary components that can be included in each storage node 106 of FIG. 1, namely, the RAM 120, the NVRAM 122, and the storage array 110. As shown in FIG. 3, the storage array 110 can include a metadata (MD) tier 314 configured to accommodate a log-structured MD page store 330. The volatile RAM 120 can include the translation table 304, at least one instance of an MD delta log 306, and the free LBA array 308. The persistent NVRAM 122 can include an MD journal 310 and a memory structure 312 for spare LBAs (or "spare LBA memory structure"). In some embodiments, the translation table 304 can be provided or implemented in the NVRAM 122 and/or demoted to a storage drive on the storage array 110.

In this example, the storage node 106 receives a plurality of delta updates of a MD page. As shown in FIG. 3, the storage node 106 converts the plurality of MD delta updates into a plurality of MD delta update tuples 302, respectively. Each of the MD delta update tuples 302 can include several parameters such as a logical index "Li" (e.g., LBA) of the MD page, an entry index "Ei" that refers to an offset within the MD page, a delta type "T" that defines the type of the delta update, and a value "V" of the delta update. The storage node 106 writes the MD delta update tuples 302 for the delta type, T, to the MD delta log 306 in the RAM 120. As further shown in FIG. 3, the MD delta log 306 can include an active set 326 of logical data containers (or "buckets") and a de-staging set 328 of logical data containers (or "buckets"). Each of the active set 326 and the de-staging set 328 of buckets can be configured to store at least some of the plurality of delta update tuples of the MD page. In some embodiments, each of the buckets of the active set 326 and the de-staging set 328 can be configured as a tree data structure (e.g., a binary tree or "b-tree") with multiple levels of nodes (e.g., top, mid, leaf) or any other suitable data structure. The storage node 106 de-stages or flushes the MD delta updates from the de-staging set 328 of buckets to the log-structured MD page store 330 in the MD tier 314 of the storage array 110.

In some embodiments, the storage node 106 can determine target buckets for the MD delta updates in the active set 326 based on a hash function of the logical index, Li, (e.g., LBA) of the MD page. The buckets of the active set (or "active HBSB") 326, as well as the buckets of the de-staging set (or "de-staging HBSB") 328, can be referred to as hash-based sorted buckets (HBSBs). In some embodiments, each of the active HBSB 326 and the de-staging HBSB 328 can be configured as a ring buffer. Such a ring buffer can be maintained using a head pointer and a tail pointer, in which new MD delta log entries are allocated from the head of the ring buffer and space reclamation is performed from the tail of the ring buffer. When MD delta updates stored in MD delta log entries at the tail of the ring buffer are de-staged (or flushed) to the log-structured MD page store 330, the MD delta log entries can be freed or reclaimed for reuse. Further, the tail pointer can be advanced as the MD delta log entries are de-staged to the log-structured MD page store 330. The head pointer can also be advanced as the new MD delta log entries are allocated for the ring buffer.

In this example, the storage node 106 writes copies of the MD delta update tuples 302 to the MD journal 310 of the NVRAM 122. In the event of a disaster, data loss, or data corruption, the storage node 106 can replay the MD journal 310 to apply the MD delta updates written thereto to the MD delta log 306 to recover it to a consistent state. In some embodiments, like the active and de-staging HBSBs 326, 328 of the MD delta log 306, the MD journal 310 can be configured as a ring buffer.

As described herein, the disclosed techniques can be performed in association with storage nodes (e.g., the storage node(s) 106) that have delta log-based architectures. As such, the storage nodes 106 are not configured to perform "in-place" MD delta updates of MD pages. In other words, the storage nodes 106 do not update existing MD pages stored at physical addresses (e.g., physical block addresses (PBAs)) by overwriting metadata content at the physical addresses with new or updated metadata content. Rather, each time an existing MD page is updated, the storage nodes 106 write the new or updated metadata content to another version of the MD page stored at a new or different physical address (e.g., PBA). As described herein with reference to the mapping structure 200 (see FIG. 2), such MD pages can be configured to map, point, or otherwise make reference to other MD pages. It can be impractical or undesirable, however, to have MD pages make reference to other MD pages using their physical addresses because storing another version of an MD page at a new or different physical address would typically require modifying one or more of the MD pages so that they make reference to the new or different physical address.

For this reason, the storage node 106 includes the translation table 304, which is configured to translate or map logical addresses (e.g., LBAs) of MD pages to their corresponding current physical addresses (e.g., PBAs). For example, with reference to the metadata structure 200 of FIG. 2, the metadata page 208 in the first layer 202 may make reference to the metadata page 210 in the second layer 204 using a logical address of the metadata page 210, while the translation table 304 provides a mapping of the logical address of the metadata page 210 to its corresponding current physical address in the third layer 206. When new or updated metadata content is received at the storage node 106 for the metadata page 210, another version of the metadata page 210 (e.g., the metadata page 212) may be stored at a corresponding new or different physical address, and the translation table 304 may be updated to translate or map the logical address of the metadata page 210 to the corresponding new or different physical address of the metadata page 212, thereby allowing the metadata page 208 in the first layer 202 to continue to make reference to the metadata page 210 in the second layer 204 using the logical address of the metadata page 210. As shown in FIG. 3, the translation table 304 includes several exemplary mappings of LBAs to PBAs ("LBA→PBA") for an MD page LBA "1" to an MD page LBA "n" at translation table (TT) entries 316.1 to 316.n, respectively, as well as an MD page LBA "12" at TT entry 322.

In this example, it is assumed that the storage array 110 has several storage tiers, including the MD tier 314 drawn from high-speed storage drives (e.g., SSDs) and at least one storage tier (not shown) drawn from slower storage drives (e.g., HHDs). It is further assumed that an MD page stored at a corresponding current physical address in the MD tier 314 has not been accessed for a while (e.g., the MD page is assumed to have become "cold") and has been evicted from the MD tier 314 and assigned to the storage tier drawn from the slower storage drives. In this example, in response to being evicted from the MD tier 314, the logical address (e.g., LBA) of the MD page is no longer in-use or referenced by any other MD page and, by consequence, its corresponding physical address (e.g., PBA) becomes obsolete or invalid. As shown in FIG. 3, the translation table 304 includes several exemplary invalid PBAs at TT entry 318, TT entry 320, and TT entry 324. At TT entry 318, the MD page LBA "10" is no longer in-use and the corresponding PBA to which it was mapped is replaced with a predefined value, "Invalid_PBA." Likewise, at TT entry 320, the MD page LBA "11" is no longer in-use and the corresponding PBA to which it was mapped is replaced with the predefined value, Invalid_PBA, and at TT entry 324, the MD page LBA "13" is no longer in-use and the corresponding PBA to which it was mapped is replaced with the predefined value, Invalid_PBA.

Once an MD page is no longer in-use or referenced by any other MD page, the storage node 106 frees or reclaims the logical address (e.g., LBA) of the MD page, and fills the free LBA array 308 by inserting or adding the freed or reclaimed LBA (e.g., 6-8 bytes) into the free LBA array 308. For example, the freed or reclaimed MD page LBA "10" may be inserted or added into the free LBA array 308 at array entry 338. Likewise, the freed or reclaimed MD page LBA "11" may be inserted or added into the free LBA array 308 at array entry 340, and the freed or reclaimed MD page LBA "13" may be inserted or added into the free LBA array 308 at array entry 342. In some embodiments, the free LBA array 308 can be configured as a ring buffer having a head pointer and a tail pointer. As such, the storage node 106 can insert or add a freed or reclaimed LBA into an array entry at the head of the free LBA array 308. The storage node 106 can also obtain a freed or reclaimed LBA from the tail of the free LBA array 308 to allocate (or reallocate) the LBA for an MD page. The storage node 106 can use the allocated (or reallocated) LBA as a unique page reference or identifier of the MD page. By allocating (or reallocating) free or reclaimed LBAs from the free LBA array 308, the storage node 106 can avoid having to perform persistent operations such as reading and updating bins of hierarchical bin structures that contain free or un-allocated logical addresses of MD pages, thereby improving overall performance of the clustered systems.

Figure 4:
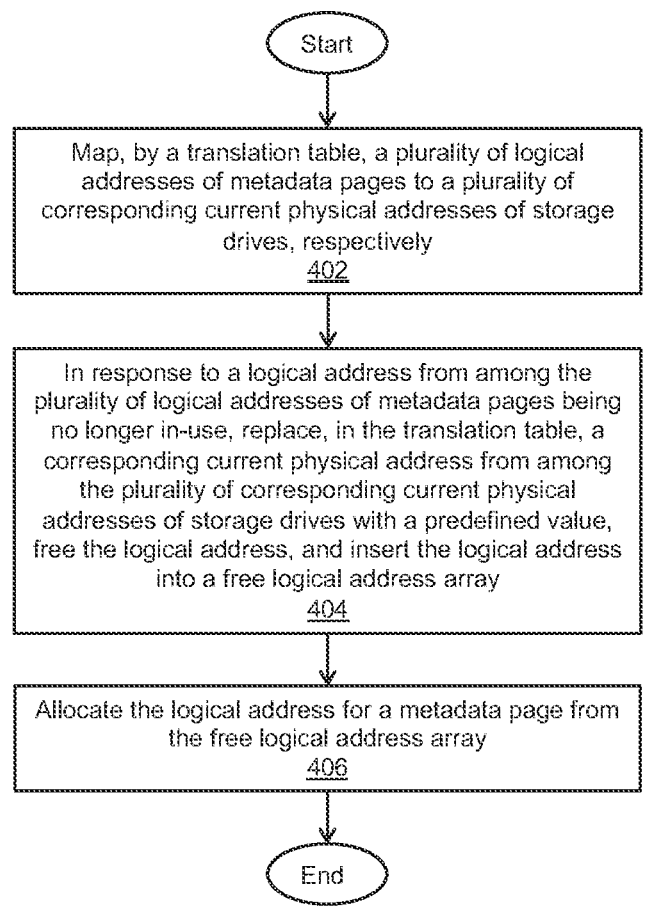
FIG. 4 is a flow diagram of an exemplary method of providing a "bin-less" metadata page allocator for clustered systems with log-structured metadata storage.

An exemplary method of providing a "bin-less" metadata page allocator for clustered systems with log-structured metadata storage is described below with reference to FIG. 4. As depicted in block 402, a plurality of logical addresses of metadata pages are mapped, by a translation table, to a plurality of corresponding current physical addresses of storage drives, respectively. As depicted in block 404, in response to a logical address from among the plurality of logical addresses of metadata pages being no longer in-use, a corresponding current physical address from among the plurality of corresponding current physical addresses of storage drives is replaced with a predefined value in the translation table, the logical address is freed, and the logical address is inserted into a free logical address array. As depicted in block 406, the logical address is allocated for a metadata page from the free logical address array. In this way, performing persistent operations on hierarchical bin structures containing logical addresses of un-allocated metadata pages can be avoided, thereby improving overall performance of the clustered systems.

Having described the above illustrative embodiments, various alternative embodiments and/or variations may be made and/or practiced. For example, it was described herein that the storage node 106 of the clustered system 102 can insert (or add) freed (or reclaimed) LBAs into array entries at the head of the free LBA array 308, as well as obtain free LBAs for allocation from array entries at the tail of the free LBA array 308. In some embodiments, such freeing/allocating of logical addresses (e.g., LBAs) can be performed under spinlock to provide atomicity on all operations (e.g., decrementing, incrementing) performed on the head/tail of the free LBA array 308. If the rate of MD page freeing/allocating is low (e.g., lower than the IO rate), then the critical section of spinlock can be very short, thereby avoiding spinlock contention or other negative impact on overall performance of the clustered system 102. In some embodiments, a separate free LBA array can be maintained per truck/core or per group of trucks/cores within the clustered system 102.

It was further described herein that once an MD page is no longer in-use or referenced by any other MD page, the storage node 106 can free or reclaim the logical address (e.g., LBA) of the MD page, and fill the free LBA array 308 by inserting (or adding) the freed (or reclaimed) LBA into the free LBA array 308. In some embodiments, to assure reliable filling (or refilling) of the free LBA array 308, the storage node 106 can scan the translation table (TT) 304 for TT entries that contain the predefined value, Invalid_PBA (see FIG. 3). As described herein, if an LBA of an MD page is no longer in-use, then its corresponding PBA in the translation table 304 is replaced with the predefined value, Invalid_PBA. In some embodiments, all free or un-allocated LBAs in the translation table 304 can be initially mapped to the predefined value, Invalid_PBA. In some embodiments, the storage node 106 can write copies of the contents of the TT entries (including any Invalid_PBA value(s)) to the MD journal 310. The storage node 106 can scan the TT entries of the translation table 304 in a background process, searching for any TT entries that contain the predefined value, Invalid_PBA. When any such TT entry is found, the storage node 106 can insert (or add) the free (or unallocated) LBA contained in the TT entry into the free LBA array 308. To avoid inserting (or adding) a free (or unallocated) LBA that is already present in the free LBA array 308 (e.g., due to a storage reclamation process), the storage node 106 can maintain a dedicated table (e.g., a hash table) that contains all reclaimed LBAs in the clustered system 102, and refer to the dedicated table before inserting (or adding) the free (or unallocated) LBA into the free LBA array 308. In some embodiments, the storage node 106 can start scanning the translation table 304 when a fill level of the free LBA array 308 falls below a predefined threshold, and stop scanning the translation table 304 when the fill level of the free LBA array 308 reaches or exceeds the predefined threshold. In some embodiments, the storage node 106 can keep track of the last scanned TT entry and re-start scanning the translation table 304, as desired and/or required, at the last scanned TT entry. In some embodiments, if the fill level of the free LBA array 308 has not been reached after having completed scanning the translation table 304 and inserting zero, one, or more LBAs into the free LBA array 308, then the storage node 106 can increase a specified maximum allowable LBA of the MD pages, expand the translation table 304 (e.g., by adding TT entries) accordingly, initialize the mapping of all new free LBAs contained in the added TT entries of the translation table 304 to the predefined value, Invalid_PBA, and insert (or add) one or more of the new free LBAs into the free LBA array 308. In some embodiments, the size of the MD tier 314 can be increased. In some embodiments, a global maximum allowable LBA variable can be employed that defines the size of the MD tier 314, as well as the size (e.g., the number of TT entries) of the translation table 304.

It was further described herein that the storage node 106 can allocate (or reallocate) freed (or reclaimed) LBAs from the free LBA array 308. In some embodiments, if the free LBA array 308 does not contain any allocatable LBAs (e.g., the free LBA array 308 may be empty), then the storage node 106 can wait until the background process of scanning the TT entries of the translation table 304 has caused a sufficient amount of LBAs to be inserted (or added) into the free LBA array 308. Alternatively, or in addition, if the free LBA array 308 is empty, then the storage node 106 can allocate one or more spare LBAs from the spare LBA memory structure 312. As shown in FIG. 3, the spare LBA memory structure 312 can include a plurality of spare LBA entries 344, 346, 348 containing spare MD page LBAs 20, 21, 22, respectively. In some embodiments, the spare LBA memory structure 312 can be provided or implemented in the RAM 120. In some embodiments, the spare LBA memory structure 312 can correspond to a dedicated contiguous area of memory (e.g., 20-40 Kb) or a specified number of MD pages (e.g., 5-10). In some embodiments, storage node 106 can fill (or refill) the spare LBA memory structure 312 by scanning TT entries of the translation table 304 in a background process to search for any TT entries that contain the predefined value, Invalid_PBA. When any such TT entry is found, the storage node 106 can insert (or add) the free (or unallocated) LBA contained in the TT entry into the spare LBA memory structure 312.

It was further described herein that the size of the MD tier 314 can be increased. In some embodiments, the size of the MD tier 314 can be reduced. In some embodiments, the translation table 304 can be shrunk (e.g., by removing TT entries) accordingly. When shrinking the translation table 304, the storage node 106 can execute a garbage collection application to assure that all TT entries being cleaned or removed from the translation table 304 contain the predefined value, Invalid_PBA. Further, when the translation table 304 is shrunk (or expanded) and/or the size of the MD tier 314 is reduced (or increased), the storage node 106 can update the specified maximum allowable LBA of the MD pages. When obtaining a freed (or reclaimed) LBA from the free LBA array 308 to allocate (or reallocate) the LBA for an MD page, the storage node 106 can compare the obtained LBA with the specified maximum allowable LBA. If the obtained LBA exceeds the specified maximum allowable LBA, then the storage node 106 can discard the LBA and obtain another LBA from the free LBA array 308 that does not exceed the specified maximum allowable LBA. In this way, it can be assured that any LBA obtained from the free LBA array 308 for allocation does not exceed the current size of the MD tier 314. In some embodiments, having shrunk the translation table 304, the storage node can scan the free LBA array 308 for array entries that contain LBAs exceeding the specified maximum allowable LBA and clean or remove those array entries from the free LBA array 308.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write metadata or user data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, object storage, virtualized device, logical unit (LU), logical unit number (LUN), logical volume, logical device, physical device, and/or storage medium. An LU may be a logical entity provided by a storage system for accessing data from the storage system and may be used interchangeably with a logical volume. An LU or LUN may be used interchangeably with each other. A LUN may be a logical unit number for identifying an LU and may refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, combination of hard drives, flash storage, combination of flash storage, combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of allocating logical addresses of metadata pages in a clustered system with log-structured metadata storage, comprising:
   mapping, by a translation table, a plurality of logical addresses of metadata pages to a plurality of corresponding current physical addresses of storage drives, respectively;
   in response to a logical address from among the plurality of logical addresses of metadata pages being no longer in-use, replacing, in the translation table, a corresponding current physical address from among the plurality of corresponding current physical addresses of storage drives with a predefined value, freeing the logical address, and inserting the logical address into a free logical address array;
   allocating the logical address for a metadata page from the free logical address array;
   scanning the translation table (TT) for TT entries that contain the predefined value; and
   initiating the scanning of the translation table in response to a specified fill level of the free logical address array falling below a predefined threshold.

2. The method of claim 1 further comprising:
   writing copies of contents of the TT entries to a persistent journal.

3. The method of claim 1 further comprising:
   in response to the scanning of the translation table (TT), identifying a TT entry that contains the logical address mapped to the predefined value.

4. The method of claim 3 further comprising:
   maintaining a dedicated table that includes all reclaimed logical addresses in the clustered system.

5. The method of claim 4 further comprising:
   determining that the logical address contained in the identified TT entry is not included in the dedicated table of reclaimed logical addresses.

6. The method of claim 5 further comprising:
   performing inserting the logical address into the free logical address array in response to the determining that the logical address is not included in the dedicated table of reclaimed logical addresses.

7. The method of claim 1 further comprising:
   in response to the specified fill level of the free logical address array reaching or exceeding the predefined threshold, terminating the scanning of the translation table.

8. The method of claim 7 further comprising:
   in response to completing the scanning of the translation table and the specified fill level of the free logical address array not reaching or exceeding the predefined threshold, increasing a maximum allowable logical address of the metadata pages, increasing a number of TT entries in the translation table, and mapping one or more free logical addresses contained in the TT entries to the predefined value.

9. The method of claim 8 further comprising:
   inserting the one or more free logical addresses into the free logical address array.

10. The method of claim 1 further comprising:
    in response to the free logical address array containing an insufficient number of free logical addresses, allocating one or more logical addresses from a memory structure containing a specified number of spare logical addresses.

11. The method of claim 1 further comprising:
    comparing the logical address for the metadata page with a maximum allowable logical address,
    wherein the allocating of the logical address for the metadata page from the free logical address array includes allocating the logical address in response to determining that the logical address does not exceed the maximum allowable logical address.

12. A system for allocating logical addresses of metadata pages in a clustered system with log-structured metadata storage, comprising:
    a memory; and
    processing circuitry configured to execute program instructions out of the memory to:
        map, by a translation table, a plurality of logical addresses of metadata pages to a plurality of corresponding current physical addresses of storage drives, respectively;
        in response to a logical address from among the plurality of logical addresses of metadata pages being no longer in-use, replace, in the translation table, a corresponding current physical address from among the plurality of corresponding current physical addresses of storage drives with a predefined value, free the logical address, and insert the logical address into a free logical address array;

allocate the logical address for a metadata page from the free logical address array;

scan the translation table (TT) for TT entries that contain the predefined value; and initiate the scanning of the translation table in response to a specified fill level of the free logical address array falling below a predefined threshold.

13. The system of claim 12 wherein the processing circuitry is further configured to execute the program instructions out of the memory, in response to the specified fill level of the free logical address array reaching or exceeding the predefined threshold, to terminate the scanning of the translation table.

14. The system of claim 13 wherein the processing circuitry is further configured to execute the program instructions out of the memory, in response to completing the scanning of the translation table and the specified fill level of the free logical address array not reaching or exceeding the predefined threshold, to:

increase a maximum allowable logical address of the metadata pages;

increase a number of TT entries in the translation table; and map one or more free logical addresses contained in the TT entries to the predefined value.

15. The system of claim 14 wherein the processing circuitry is further configured to execute the program instructions out of the memory to insert the one or more free logical addresses into the free logical address array.

16. A computer program product including a set of non-transitory, computer-readable media having instructions that, when executed by processing circuitry, cause the processing circuitry to perform a method comprising:

mapping, by a translation table, a plurality of logical addresses of metadata pages to a plurality of corresponding current physical addresses of storage drives, respectively;

in response to a logical address from among the plurality of logical addresses of metadata pages being no longer in-use, replacing, in the translation table, a corresponding current physical address from among the plurality of corresponding current physical addresses of storage drives with a predefined value, freeing the logical address, and inserting the logical address into a free logical address array; and allocating the logical address for a metadata page from the free logical address array;

scanning the translation table (TT) for TT entries that contain the predefined value; and initiating the scanning of the translation table in response to a specified fill level of the free logical address array falling below a predefined threshold.

17. The computer program product of claim 16 wherein the method further comprises:

in response to the specified fill level of the free logical address array reaching or exceeding the predefined threshold, terminating the scanning of the translation table.

18. The computer program product of claim 17 wherein the method further comprises:

in response to completing the scanning of the translation table and the specified fill level of the free logical address array not reaching or exceeding the predefined threshold, increasing a maximum allowable logical address of the metadata pages, increasing a number of TT entries in the translation table, and mapping one or more free logical addresses contained in the TT entries to the predefined value.

19. The computer program product of claim 18 wherein the method further comprises:

inserting the one or more free logical addresses into the free logical address array.

20. The computer program product of claim 16 wherein the method further comprises:

in response to the free logical address array containing an insufficient number of free logical addresses, allocating one or more logical addresses from a memory structure containing a specified number of spare logical addresses.

* * * * *